Figure 1:
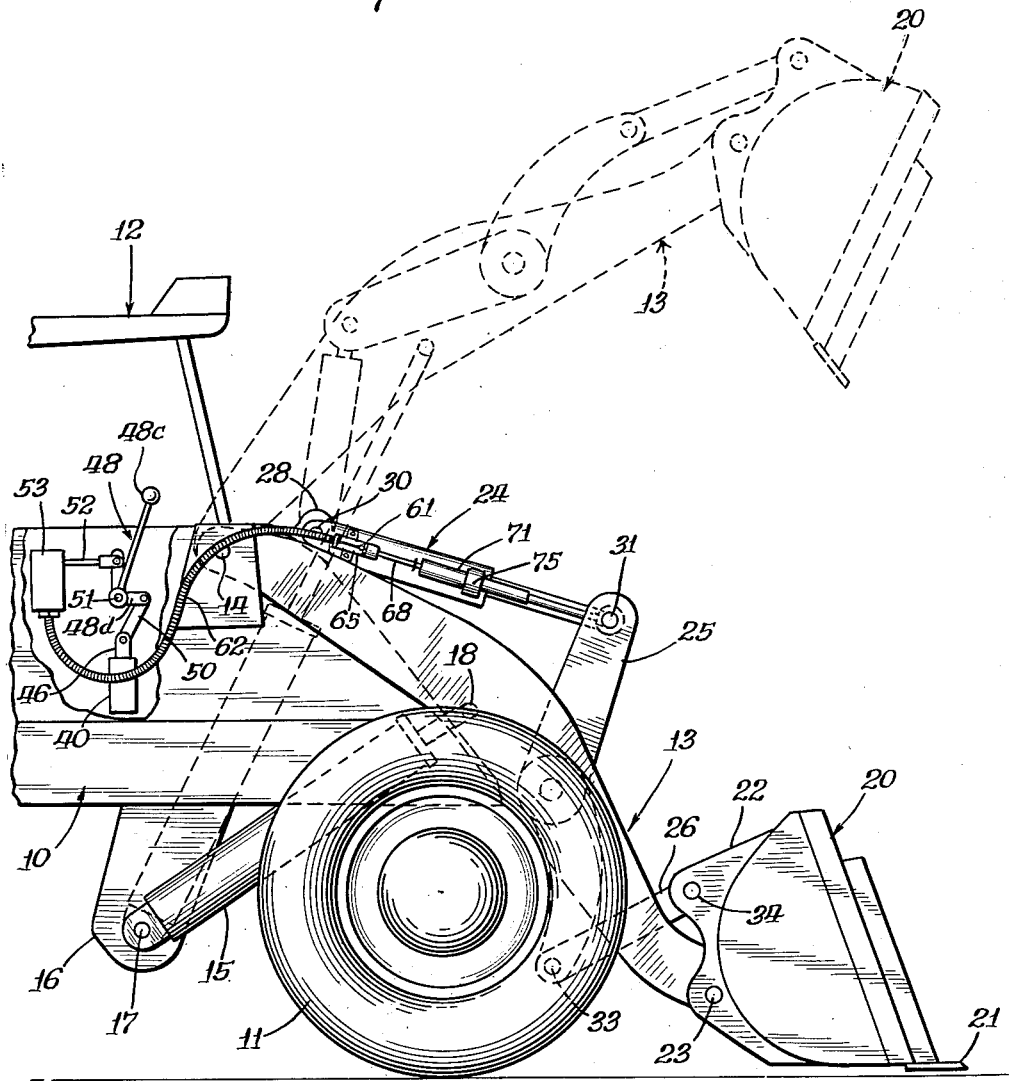

July 27, 1965 R. C. THICKPENNY 3,197,051
BUCKET INDEXING MECHANISM FOR TRACTOR LOADERS
Filed April 30, 1963 2 Sheets-Sheet 1

INVENTOR.
Robert C. Thickpenny
BY Hilmard O. Vogel
Atty.

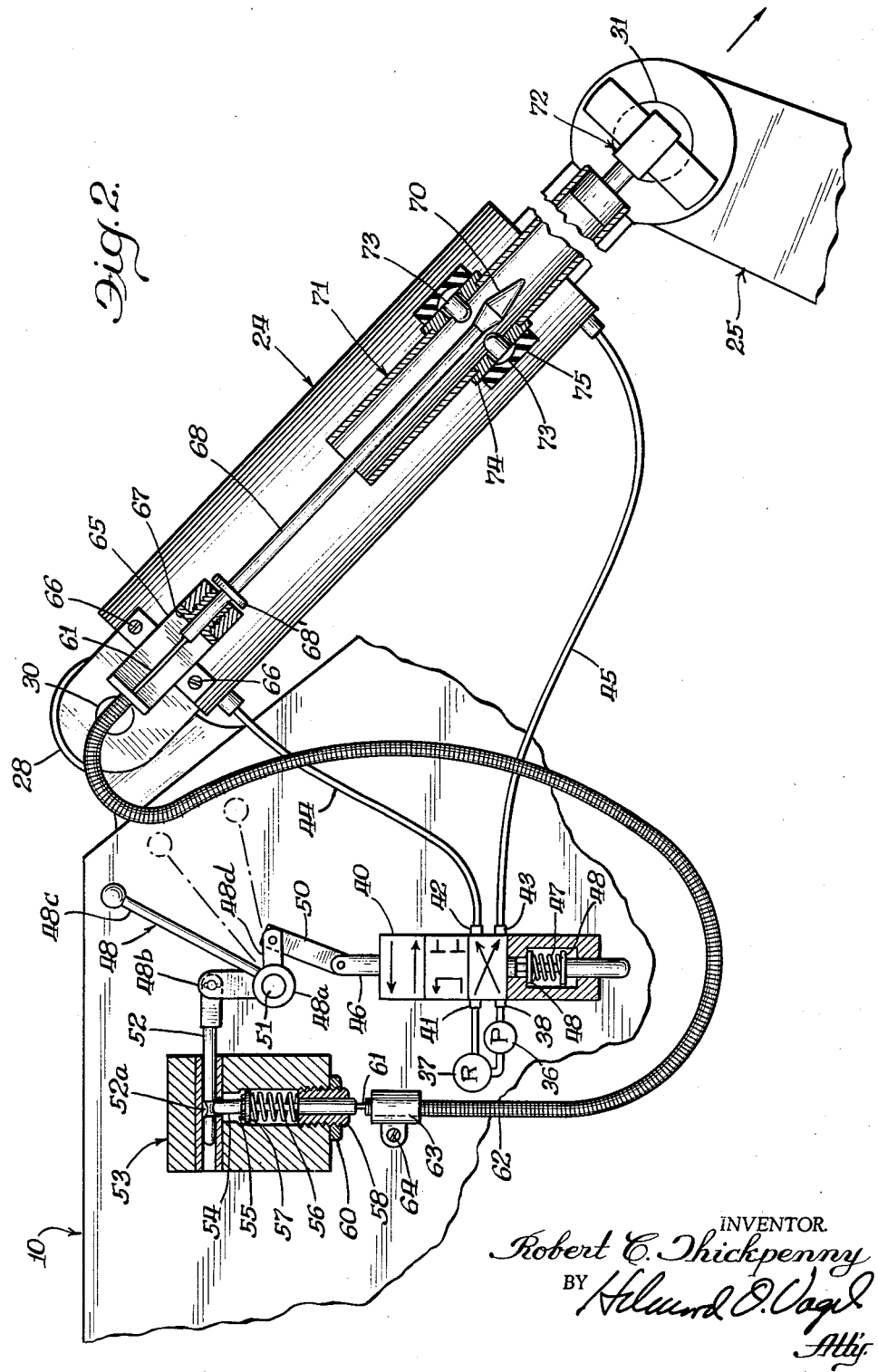

United States Patent Office 3,197,051
Patented July 27, 1965

3,197,051
BUCKET INDEXING MECHANISM FOR TRACTOR LOADERS
Robert C. Thickpenny, Libertyville, Ill., assignor to The Frank G. Hough Co., a corporation of Illinois
Filed Apr. 30, 1963, Ser. No. 276,882
5 Claims. (Cl. 214—140)

This invention relates generally to front-end type tractor loaders, and more specifically to a novel arrangement providing automatic indexing of the bucket in a predetermined position.

The primary object of the present invention is to provide a novel arrangement for accurately and positively indexing the bucket of a front-end type tractor loader in a predetermined position.

It is a further object to provide novel indexing for a hydraulically operated front-end type tractor loader which will operate in cooperation with the bucket-tilting means to provide automatic indexing of the bucket in a predetermined tilted position.

It is still another object to provide a novel indexing means in accordance with the preceding paragraph which may be easily manually overriden.

It is still another object to provide a novel indexing means according to the preceding paragraph in which the indexing means will operate to index the bucket independently of the position of movement of the boom.

It is a further object to provide a novel indexing means according to the preceding paragraph which will automatically operate when the bucket is being pivoted from a dump position toward a digging position to stop the bucket in a predetermined digging position.

Other objects and features of the invention will be apparent upon a perusal of the following specification and drawings in which:

FIGURE 1 is a partial side elevational view of a front-end type tractor loader constructed according to the present invention; and FIGURE 2 is an enlarged partial view of the structure shown in FIGURE 1.

The present embodiment is the preferred embodiment, but it is to be understood that changes can be made in the present embodiment by one skilled in the art without departing from the spirit and scope of the present invention.

Generally, the novel indexing means of the invention is partially carried on the tractor and partially carried on the bucket-tilting assembly of a front-end type tractor loader. The bucket-tilting assembly of the tractor loader includes a double-acting hydraulic cylinder, one end of which is pivotally carried on the tractor, and the other end of which is connected to the bucket by a link and leverage arrangement. The double-acting hydraulic cylinder is selectively extended or retracted to pivot the bucket relative to the boom. In the present embodiment, an extension of the hydraulic cylinder causes the bucket to be pivoted rearwardly to what is commonly called a breakout position. A substantially complete retraction of the hydraulic cylinder will cause the bucket to be pivoted to a dump position. Intermediate the breakout and dump positions is a ground level digging position which is commonly called the digging position.

The hydraulic cylinder is selectively extended and retracted by means of a hand lever carried in the operator's compartment of the tractor loader. That hand lever is suitably connected to the bucket spool of a hydraulic control valve. Each end of the hydraulic cylinder is connected by conduits to the control valve, and a source of hydraulic fluid pressure and a reservoir are also connected to the control valve. It is contemplated in the present invention that the control valve be of the type commonly known as an open center valve. In such a valve, the valve spool is normally spring biased to a center neutral position. In the neutral position, both ends of the hydraulic cylinder are blocked and the source of hydraulic fluid pressure is connected to the reservoir conduit. Moving the hand lever in one direction from the center neutral position will cause the source of hydraulic fluid pressure to be connected to one end of the hydraulic cylinder while the other end of the cylinder is connected to the reservoir. Manual movement of the lever in the opposite direction from the center neutral position will cause a reversal of the connections of the source of hydraulic fluid pressure and the reservoir to the hydraulic cylinder. Thus it may be seen that when the operator moves the hand lever in one direction from the center neutral position, the bucket is pivoted in one direction, one the opposite direction causes pivoting of the bucket in the opposite direction, and when the hand lever is released, the lever will automatically return to the center neutral position and any fluid flow between the control valve and the hydraulic cylinder will be blocked.

In the present invention, the hand lever is provided with a lever arm connected to a detent rod arranged so that when the detent rod is held against lengthwise movement, the hand lever is correspondingly held against movement. A flexible cable assembly having a control wire carried for longitudinal reciprocating movement within a sheath is secured at one end thereof in cooperation with the detent rod and at the other end thereof on the surface of the bucket-tilting hydraulic cylinder. The end of the flexible cable assembly cooperating with the detent rod is provided with a spring biased pawl secured to the end of the control wire, and the pawl engages the detent rod to hold the hand lever of the control valve against movement when the hand lever is in the particular operated position for retraction of the hydraulic cylinder. In that position the holding force of the pawl will overcome the force of the spring biasing means in the control valve.

The end of the flexible cable assembly which is carried on the surface of the hydraulic cylinder is positioned at the head end thereof, and the control wire is connected to one end of a rod which is carried for limited lengthwise movement and which extends along the cylinder. The other end of the extending rod is provided with an enlarged tip section which projects into a tubular assembly. The tubular assembly is carried at one end thereof on the piston rod of the hydraulic cylinder so that the tubular assembly cooperates with the extending rod in a telescoping arrangement. The tubular assembly is provided with a plurality of radially inwardly extending buttons which at their inner ends define an opening smaller than the diameter of the tip section of the extending rod. A resilient sleeve carried over the buttons permits the buttons to be forced radially outwardly. When the bucket is being pivoted from a dump position toward the breakout position the tubular assembly in moving with the piston rod will carry the buttons to engage the tip section of the extending rod to exert a pulling force on the extending rod. This pulling force on the extending rod will result in a pulling of the control wire through the sheath of the flexible cable assembly and will result in a withdrawing of the pawl on the other end of the control wire from the detent rod. When the pawl releases the detent rod, the valve spool spring is free to return the hand lever and the valve spool to the center neutral position. When the control valve spool reaches the center neutral position, the hydraulic cylinder and the bucket pivoted thereby will be stopped. The particular position at which the bucket will be stopped will be dependent upon the position at which the buttons of the tubular assembly engage the tip section of the extending rod to draw the pawl from the detent rod. This position is predetermined by an appropriate relative positioning of the tubular assembly and the extending rod to provide the desired indexed position of the bucket.

If the hand lever is held in the operated position for extension of the hydraulic cylinder, the release of the detent rod by the pawl will be of no effect, and the hydraulic cylinder will continue to extend until the hand lever is released. As the hydraulic cylinder extends beyond the indexed position, the resilient sleeve will permit the buttons to ride over the tip section of the extending rod. In the retraction of the hydraulic cylinder from a substantially extended position, the buttons of the tubular assembly will merely ride over the tip section of the extending rod. The control wire of the flexible cable assembly will not be moved as the stop on the end of the extending rod will be in engagement with the surface of the mounting bracket.

The present invention substantially increases the efficiency of a front-end type tractor loader by freeing the operator of the tractor loader from the necessity of repeatedly positioning the bucket in the digging position. In the customary front-end type tractor loader, the work cycle of digging a load, tilting the bucket to the breakout position, raising the boom to a position for convenient carrying of the bucket, carrying the loaded bucket to a position for dumping, generally further raising the boom for dumping of the loaded bucket onto a pile or into a truck, pivoting the bucket to the dump position to deposit the load, lowering the boom and pivoting the bucket from the dump position to the digging position, is constantly repeated. The present invention results in a substantial reduction in work cycle time by permitting the operator of the loader to move the hand lever of the bucket control valve to the position for pivoting of the bucket from the dump position toward the digging position, and while the bucket is pivoting toward the dig position without any further attention from the operator, the operator may concentrate on lowering the boom and returning the tractor to the digging area. This procedure enables the operator to more rapidly and effectively control the tractor loader to substantially shorten the cycle time. Another advantage in providing automatic indexing of the bucket in the digging position results from the physical size of front-end type tractor loaders known in the art, and the position of the operator on the tractor. Because the operator is positioned rearwardly and above the bucket and is removed therefrom a substantial distance, it is oftentimes difficult to visually gauge the exact tilted or pivoted position of the bucket for digging with the cutting edge thereof. The automatically indexed digging position of the bucket avoids this problem and enables the operator to quickly and confidently perform digging operations.

It will be apparent from the description of the invention that the invention may be used to index the bucket in pivoted positions other than the digging position, or that some tool or implement other than a digging bucket may be indexed in some particular position, or that the invention might also be applied to the hydraulic cylinder assembly for raising and lowering the boom to provide for automatic indexing of the boom in some predetermined position.

In detail, the forward end of one type of tractor loader is shown in FIGURE 1 in side elevation with the boom in a lowered position and with the bucket in the digging position. The dotted lines in FIGURE 1 show the boom in a raised position and the bucket in a dump position.

The tractor comprises a frame 10 supported at the forward end thereof on wheels 11. An operator's compartment 12 is carried on the frame 10.

The loader comprises a boom assembly 13 which is pivotally connected at the rearward end thereof to the tractor by pin means 14. The other end of the boom assembly 13 extends forwardly of the tractor. The forward end of the boom assembly 13 is raised and lowered by hydraulic cylinder means such as hydraulic cylinder 15. The head end of the hydraulic cylinder 15 is pivotally connected to a bracket 16 by a pin 17. The bracket 16 is secured to the frame 10 of the tractor to depend therefrom. The rod end of the hydraulic cylinder 15 is pivotally connected to the boom assembly 13 intermediate the ends thereof by a pin 18.

A digging bucket 20 having a cutting edge 21 carried on the forward marginal edge of the bottom wall thereof is pivotally carried on the forward end of the boom assembly 13. Flanges such as flange 22 secured to the rearward side of the bucket are provided for the pivotal connection of the bucket 20 to the boom assembly 13. A pin assembly 23 is journaled through the flange 22 and the forward end of the boom assembly 13.

The pivotal position of the bucket relative to the boom is determined by bucket-tilting means comprising a hydraulic cylinder 24, a lever assembly 25 and a link assembly 26. The head end of the hydraulic cylinder 24 is pivotally connected to a bracket 28 by a pin 30. The bracket 28 is carried on the forward end of the tractor substantially at the transverse center thereof. The rod end of the hydraulic cylinder 24 is pivotally connected to one end of the lever assembly 25 by a pin assembly 31. The lever assembly 25 is pivotally carried intermediate the ends thereof on the boom assembly 13 intermediate the ends thereof by a pin assembly 32. The other end of the lever assembly 25 is pivotally connected to one end of the link assembly 26 by a pin assembly 33. The other end of the link assembly 26 is pivotally connected to flanges 22 carried on the rear wall of the bucket 20 by a pin assembly 34. The various described members of the bucket-tilting means are relatively sized and positioned so that when the hydraulic cylinder 24 is partially extended and the boom is substantially lowered as shown in FIGURE 1, the lever assembly 25 is positioned in a substantially vertical direction and the bucket 20 is positioned in the ground level digging position. When the hydraulic cylinder 24 is substantially completely extended, the bucket 20 is pivoted rearwardly about the axis of the pin assembly 23 to the breakout position. When the hydraulic cylinder 24 is substantially completely retracted, the bucket 20 is pivoted in a clockwise direction as viewed in FIGURE 1 to the dump position.

Any suitable hydraulic valve and conduit means (not shown) may be supplied for selective operation of the hydraulic cylinder 15 by the operator of the tractor loader. The drawings somewhat schematically show the hydraulic valve and conduit means for selective operation of the hydraulic cylinder 24.

A source of hydraulic fluid pressure or pump 36 is provided with the suction side thereof connected to a hydraulic fluid reservoir 37. The pressure side of the pump 36 is connected to a port 38 of the bucket control valve 40. The reservoir 37 is connected by a conduit to a port 41 of the valve 40. The control valve 40 is further provided with ports 42 and 43. Port 42 is connected by a conduit 44 to the head end of the hydraulic cylinder 24, and port 43 is connected by a conduit 45 to the rod end of the hydraulic cylinder 24.

The bucket control valve 40 is provided with a valve spool 46 which is carried in a bore in the body of the valve 40 for sliding reciprocating movements therein. The valve spool 46 is self centered in a center neutral position by the biasing forces exerted by compressed coiled spring 47. The compressed coiled spring 47 is carried about a reduced portion of the valve spool 46 and is disposed between a pair of washers 48 which abut the annular walls at each end of the reduced section of the valve spool 46. The washers 48 also abut the annular side walls of an enlarged cylindrical section of the valve 40. Thus it may be seen that when the valve spool 46 is drawn outwardly of the body of the valve 40, such as is shown in FIGURE 2, the coiled spring 47 is further compressed as one of the washers 48 is drawn toward the other washer 48. If the valve spool 46 is released, the compressed coiled spring 47 in acting against the washer 48 which was moved will move the spool 46 to the center neutral position. By moving the valve spool 46 inwardly of the body of the valve 40, the other washer 48 will be moved with the valve spool 46 to further compress coiled spring 47. The described centering arrangement for the valve spool 46 is merely by way of example, and other types of self centering spool arrangements may be used. The valve bore and spool 46 of the valve 40 are provided with suitable lands and grooves cooperating with the ports 38, 41, 42 and 43 so that when the valve spool 46 is positioned in the center neutral position, port 38 is connected to 41, and ports 42 and 43 are blocked. The valve 40 is further constructed so that when the valve spool 46 is moved outwardly to a position shown in FIGURE 2, port 38 is connected in free fluid communication with port 42, and port 41 is connected in free fluid communication with port 43. The valve 40 is further constructed so that when the valve spool 46 is moved inwardly beyond the center neutral position, port 38 is connected in free fluid communication with port 43, and port 42 is connected in free fluid communication with port 41. From the foregoing it is evident that in the operated position of the valve 40 shown in FIGURE 2, hydraulic fluid under pressure is being delivered to the head end of the hydraulic cylinder 24, while hydraulic fluid from the rod end of the cylinder 24 is being returned to the reservoir 37 to thereby cause an extension of the hydraulic cylinder 24. It further may be seen that if the valve spool 46 is moved to the center neutral position, any fluid movement between ports 42 and 43 and the hydraulic cylinder 24 will be blocked to stop the hydraulic cylinder 24 at whatever extended position it had attained when the valve spool 46 was moved to the center neutral position. Further at that time, the hydraulic fluid under pressure from the pump 38 will merely be returned to the reservoir 37. If the valve spool 46 is moved inwardly beyond the center neutral position, the resulting operated condition of the valve 40 will cause a retraction of the hydraulic cylinder 24 until the valve spool 46 is again moved to the center neutral position.

The means for manually moving the valve spool 46 comprises a hand lever assembly 48 connected to the valve spool 46 by a link assembly 50. It is contemplated that the valve 40 be carried in the operator's compartment 12 of the tractor at a convenient location therein. The hub 48a of the hand lever assembly 48 may then be journaled on a pin 51 which is fixed to the tractor at some convenient location in the operator's compartment 12. The hand lever assembly 48 comprises a lever arm 48b, a hand lever 48c, and a lever arm 48d, all extending radially outwardly of the hub portion 48a thereof. One end of the link 50 is pivotally connected to the extending end of the lever arm 48d and the other end of the link 50 is pivotally connected to the extending end of the valve spool 46. As shown in FIGURE 2, this arrangement results in a raised position of the hand lever 48c with the valve spool 46 positioned to provide for extension of the hydraulic cylinder 24. When the hand lever 48c is pivoted downwardly to the first dotted line position shown in FIGURE 2, the valve 40 will be operated to the center neutral position, and when the hand lever 48c is moved further downwardly to the other dotted line position shown in FIGURE 2, the valve 40 will be operated to the position for retraction of the hydraulic cylinder 24.

The upwardly extending end of the lever arm 48b of the hand lever assembly 48 is pivotally connected to one end of a detent rod 52. The other end of the detent rod 52 is slidably carried in a hole through a member 53. The pivotal connection between the detent rod 52 and the lever arm 48b is formed to permit the detent arm 52 to move slightly toward and away from the axis of rotation of the pin 51 so that as the hand lever 48c is pivoted, the detent arm 52 may be moved along its longitudinal axis in the fixed member 53. The member 53 is conveniently carried in the tractor so that the detent rod 52 is slidably reciprocated through the member 53 as the hand lever 48c is moved to rotate the hub portion 48a of the hand lever assembly 48. The detent rod 52 is provided with a notch portion 52a which is positioned therein so that when the hand lever assembly 48 is in the raised position, the notch 52a is positioned in alignment with a hole which intersects the hole carrying the detent rod 52. The intersecting hole carries a pawl 54 which is spring biased by snap or lock ring 55, a compressed coiled spring 56, and a second washer 57, to project into the hole carrying the detent rod 52. When the hand lever 48c is in the raised position as shown in FIGURE 2, the pawl 54 engages the notch 52a of the detent rod 52, and the biasing force of the compressed coiled spring 56 is sufficient to overcome the centering force of the compressed coiled spring 47 in the valve 40 to hold the hand lever 48c in that raised position.

The pawl 54, and its biasing arrangement of lock ring 55 and washer 57 and compressed coiled spring 56 are retained in the member 53 by a threaded sleeve 58 and a nut 60. The lower end of the pawl 54 extends outwardly of the threaded sleeve 58 and is thereat connected to one end of a control wire 61. The control wire 61 forms part of a flexible cable assembly and the remaining portion of the control wire 61 extends through a cable sheath 62 of the flexible cable assembly and outwardly of the other end thereof as may be seen in FIGURE 2. One end of the cable sheath 62 is secured in the tractor by a collar 63 and a fastener 64. The other end of the cable sheath 62 is secured to a bracket 65, and the bracket 65 is secured on the outer surface of the hydraulic cylinder 24 at the head end thereof by fasteners 66. The bracket 65 is positioned so that the end of the control wire 61 extending from the cable sheath 62 is aligned for reciprocating movement along an axis parallel to the longitudinal axis of the hydraulic cylinder 24. From the foregoing it may be seen that if the end of the control wire 61 at the hydraulic cylinder 24 is drawn toward the rod end of the cylinder 24, the pawl 54 will be withdrawn from the notch 52a of the detent rod 52. When the detent rod 52 is no longer held by the pawl 54, the centering force of the compressed coiled spring 47 will move the valve spool 46 and the hand lever assembly 48 to the center neutral position.

The bracket 65 is provided with a cylindrical sleeve 67 the axis of which is concentric with the axis of the extending end of the control wire 61 in the bracket 65. The cylindrical sleeve 67 slidably carries one end of a rod 68, and that end of the rod 68 is secured to the extending end of the control wire 61 in the bracket 65. The other end of the extending rod 68 is provided with an enlarged tip section 70. The rod 68 is also provided with a stop 68', to limit movement of the rod 68 in one direction. The extending rod 68 with the tip section 70 thereof is positioned in a telescoping arrangement in a tubular assembly 71.

The tubular assembly 71 is exclusively carried at one end thereof from the end of the piston rod of the hydraulic cylinder 24. The tubular assembly 71 must be carried so that it does not pivot relative to the longitudinal axis of the hydraulic cylinder 24 but merely moves along an axis parallel to the longitudinal axis of the hydraulic cylinder 24 as the hydraulic cylinder 24 is extended and retracted. The end of the tubular assembly 71 opposite from that end which receives the extending rod 68 is provided with a bracket assembly 72 which permits the tubular assembly 71 to be carried with the piston rod of the hydraulic cylinder 24 as the hydraulic cylinder 24 extends and retracts. Thus it may be seen that as the hydraulic cylinder 24 extends and retracts, the tubular assembly will be longitudinally moved over the extending rod 68 to provide relative longitudinal movement between the tip section of the extending rod 68 and the interior of the tubular assembly 71.

The tubular assembly 71 includes a plurality of buttons 73. The buttons 73 are journaled through holes in a sleeve member 74 which forms part of the tubular assembly 71 and is positioned intermediate the ends thereof. The buttons 73 are positioned in a spaced apart relationship and circumferentially of the sleeve 74, and extend radially inwardly toward the longitudinal axis of the tubular assembly 71. When the buttons 73 are disposed in their innermost positions toward the longitudinal axis of the tubular assembly 71, the inner ends of the buttons 73 define an opening which is smaller than the largest diameter of the tip section 70 of the extending rod 68. A convenient number of buttons 73, such as 3 or 4, may be provided. The buttons 73 are held in their innermost positions by a resilient sleeve 75 which is formed of an elastomer material such as rubber, and which is positioned over the sleeve 74 and the outer ends of the buttons 73. From the foregoing it may be seen that whenever the tubular assembly 71 is moved to bring the inner ends of the buttons into engagement with the tip section 70 of the extending rod 68, the buttons 73 will be forced radially outwardly by the tip section 70, and because of the biasing force of the elastomer sleeve 75 and the coefficient of friction between the buttons 73 and the tip section 70, a force will be exerted on the extending rod 68 tending to move the extending rod 68 along its longitudinal axis as the tubular assembly 71 is moved. The tip section 70 of the extending rod 68 is tapered so that a substantial gripping force is exerted by the buttons 73 on the extending rod 68 when the hydraulic cylinder 24 is extended and so that a minimum gripping force is exerted on the extending rod 68 when the hydraulic cylinder 24 is retracted.

The buttons 73 and the tip section 70 are further relatively positioned, respectively in the tubular assembly 71 and on the extending rod 68, so that immediately before the hydraulic cylinder 24 reaches the particular extended position shown in FIGURE 1, the buttons 73 will engage the tip section 70 and will releasably grip the tip section 70 as the hydraulic cylinder 24 slightly further extends to pull on the control wire 61 and thereby draw the pawl 54 from the notch 52a in the detent rod 52. As the pawl 54 releases the detent rod 52, the centering force of the compressed coiled spring 47 will move the valve spool 46 to the center neutral position. The hydraulic cylinder 24 will thereby be effectively stopped in the extended position shown in FIGURE 1, which has previously been described as the particular extended position which pivotally positions the bucket 20 in the digging position.

If the operator manually holds the hand lever 48c in the raised position when the buttons 73 engage the tip section 70 and the pawl 54 releases the detent rod 52, the hydraulic cylinder 24 will continue to extend, and the buttons 73 will pass over and be moved forwardly of the tip section 70. This arrangement thus provides means by which the operator can override the automatic indexing operation.

If the hydraulic cylinder 24 is retracted from a substantially completely extended position, the buttons 73 will merely slide over the tip section 70 and will not affect the operation of the valve 40.

It should be noted that the subject invention is operated only when the bucket is pivoted in one direction. It should be further noted that the operation of the present invention is independent of the position of the boom. In other words, the automatic indexing of the bucket is a function only of the operation of the hydraulic cylinder 24. To change the particular indexed position of the bucket 20, it is merely necessary to change the position at which the buttons 73 engage the tip section 70 for a selected indexed position of the bucket 20 as represented by a certain operated position of the hydraulic cylinder 24.

Having described the invention what is considered new and desired to be protected by Letters Patent is:

1. In a tractor loader having a pivotally carried bucket, a reciprocating hydraulic cylinder connected to said bucket for pivoting said bucket, a hydraulic valve having a valve spool carried in said valve for longitudinal reciprocating movement from a restored position, means for restoring said valve spool, hydraulic circuit means connecting said valve to said hydraulic cylinder for operation of said hydraulic cylinder responsive to longitudinal reciprocating movement of said valve spool, linkage and leverage means connected to said valve spool and manually operable to longitudinally reciprocate said valve spool, a detent rod connected to said linkage and leverage means to move responsive to operations of said linkage and leverage means, spring biased pawl means positioned to engage said detent rod responsive to movement of said detent rod to a particular position by a particular operation of said linkage and leverage means to hold said linkage and leverage means operated, and cable actuated means operated responsive to a particular operation of said hydraulic cylinder for disengaging said pawl from said detent rod to permit said valve spool to restore.

2. In a tractor loader having a pivotally carried bucket, a reciprocating hydraulic cylinder connected to said bucket for pivoting said bucket, a hydraulic valve having a valve spool carried in said valve for longitudinal reciprocating movement from a restored position, means for restoring said valve spool, hydraulic circuit means connecting said valve to said hydraulic cylinder for operation of said hydraulic cylinder responsive to longitudinal reciprocating movement of said valve spool, linkage and leverage means connected to said valve spool and manually operable to longitudinally reciprocate said valve spool, a detent rod connected to said linkage and leverage means to move responsive to operations of said linkage and leverage means, spring biased pawl means positioned to engage said detent rod responsive to movement of said detent rod to a particular position by a particular operation of said linkage and leverage means to hold said linkage and leverage means operated, and mean operated responsive to a particular operation of said hydraulic cylinder for disengaging said pawl from said detent rod to permit said valve spool to restore, said last named means comprising a flexible cable assembly of a control wire carried in a cable sheath for reciprocating movement therein, one end of said cable sheath being fixed to carry one end of said control wire in cooperation with said pawl, said one end of said control wire being connected to said pawl, the other end of said cable sheath being carried on the surface of said hydraulic cylinder, and means carried on the surface of said hydraulic cylinder and connected to the other end of said control wire and operating responsive to a particular operation of said hydraulic cylinder for moving said control wire to disengage said pawl from said detent rod.

3. In a tractor loader having a pivotally carried bucket, linkage means including a hydraulic cylinder and connected to said bucket so that said bucket is pivoted responsive to operations of said hydraulic cylinder, a hydraulic valve selectively alternatively operable from a neutral restored position to a first operated position and a second operated position, means for biasing said hydraulic valve to said neutral restored position, a hand lever, linkage and leverage means connecting said hand lever to said valve for operating said valve responsive to manual movements to said hand lever, hydraulic circuit means connecting said hydraulic valve to said hydraulic cylinder for operation of said hydraulic cylinder responsive to operations of said hydraulic valve to said first and second operated positions thereof, and indexing means including one means associated with said linkage and leverage means and operating responsive to a manual movement of said hand lever to operate said hydraulic valve to said first operated position thereof to hold said linkage and leverage means to hold said hydraulic valve operated to said first operated position and other means operating responsive to a particular operation of said hydraulic cylinder for restoring said one means to release said linkage and leverage means to permit said means for biasing said hydraulic valve to said neutral restored position to restore said hydraulic valve to said neutral restored position, said one means of said indexing means associated with said linkage and leverage means comprising a detent rod and pawl, spring means biasing said pawl into engagement with said detent rod, said detent rod being connected to said linkage and leverage means, said detent rod and said pawl being arranged so that when said hydraulic valve is operated to said first operated position thereof said pawl engages said detent rod to hold said linkage and leverage means to hold said hydraulic valve in said first operated position thereof, said other means of said indexing means comprising rod means carried on the surface of said hydraulic cylinder and means operating responsive to an operation of said rod means for drawing said pawl out of engagement with said detent rod, said rod means operating responsive to a particular operation of said hydraulic cylinder.

4. In a tractor loader as defined in claim 3, wherein said rod means comprises an extending rod slidably carried on the surface of said hydraulic cylinder for longitudinal movement along a line parallel to the longitudinal axis of said hydraulic cylinder, one end of said extending rod having an enlarged tip section, a tubular member connected to the piston rod of said hydraulic cylinder and extending over said one end of said extending rod in a telescoping arrangement therewith, means carried on said tubular member for momentarily gripping and longitudinally moving said extending rod when said hydraulic cylinder is extended a certain amount, and said means operating responsive to an operation of said rod means comprises a flexible cable assembly of a control wire carried in a cable sheath for reciprocating movement therethrough, one end of said cable sheath secured to said tractor, the other end of said cable sheath secured to the surface of said hydraulic cylinder, one end of said control wire connected to the other end of said extending rod, the other end of said control wire connected to said pawl.

5. In a tractor loader as defined in claim 4, wherein said means carried on said tubular member for momentarily gripping said enlarged tip section of said extending rod comprises a plurality of button members journaled through said tubular member and positioned circumferentially thereabout with the inner ends of said button members extending radially inwardly toward the longitudinal axis of said tubular member and said extended rod, and a sleeve member formed of an elastomer material and carried on said tubular member over said button members to resiliently urge said button member toward the longitudinal axis of said tubular member.

References Cited by the Examiner

UNITED STATES PATENTS

| 2,755,776 | 7/56 | Morris | 91—389 X |
| 2,817,317 | 12/57 | Dommel et al. | 91—389 X |
| 3,045,845 | 7/62 | Hackett et al. | 214—140 |

HUGO O. SCHULZ, *Primary Examiner.*